| United States Patent [19] | [11] Patent Number: 4,885,183 |
| Strandholm et al. | [45] Date of Patent: Dec. 5, 1989 |

[54] METHOD FOR CONTROLLING MELTING PROPERTIES OF PROCESS CHEESE

[75] Inventors: John J. Strandholm, Morton Grove; Robert R. Prochnow, Deerfield; Mark S. Miller, Arlington Heights; Lawrence E. Woodford, Palatine; Steven M. Neunaber, Morton Grove, all of Ill.

[73] Assignee: Kraft, Inc., Glenview, Ill.

[21] Appl. No.: 259,975

[22] Filed: Oct. 19, 1988

[51] Int. Cl.$^4$ ..................... A23C 19/08; A23C 19/084
[52] U.S. Cl. ..................................... 426/582; 426/583
[58] Field of Search ............................... 426/582, 583

[56] References Cited

U.S. PATENT DOCUMENTS

| 3,962,483 | 6/1976 | Schulz | 426/582 |
| 4,166,142 | 8/1979 | Chang | 426/582 |
| 4,291,067 | 9/1981 | Buhler et al. | 426/582 |
| 4,552,774 | 11/1985 | Gronfor | 426/582 |
| 4,766,003 | 8/1988 | Skovhauge | 426/582 |

OTHER PUBLICATIONS

Nutritional Quality and Meltability of Cheese From Ultrafiltered Milk, S. K. Collinge, et al., Utah State University, Jul. 22, 1987; abstract published in *Journal of Dairy Science*, vol. 70, p. 67, Supp. 1, Jun., 1987 (Collinge I).

Relationship Between Soluble Nitrogen at pH 4.6 and Meltability of Pasteurized Process Cheese Food Made From U.F. Curd, S. K. Collinge, et al., *Journal of Diary Science*, vol. 71, p. 71, Supp. 1, Jun. 1988 (Collinge II).

Melting Properties of Process Cheese Foods Made From Ultrafiltered Whole Milk Curd, S. M. K. Anis, et al., *Journal of Dairy Science*, vol. 67, p. 79, Supp. 1, 1986 (Anis).

Meltability and Rheology of Model Process Cheese Containing Acid and Rennet Casein, P. Savello, Dissertation Abstracts International, vol. 44, No. 11, p. 3347-B, May, 1984 (Savello).

*Primary Examiner*—Donald E. Czaja
*Assistant Examiner*—H. Pratt
*Attorney, Agent, or Firm*—Fitch, Even, Tabin & Flannery

[57] ABSTRACT

In accordance with the present invention, the meltability of processed cheese is controlled to provide a desired degree of meltability by incorporating whey proteins in the process cheese mix and processing the process cheese mix under conditions of temperature and time so as to denature the whey proteins sufficiently to provide a predeterminted level of cross-linked beta-lactoglobulin and provide the desired level of meltability. The whey protein provided in the process cheese blend is selected to limit the lactose in the final product to a predetermined level. The method of the present invention avoids the need for the use of sodium hexametaphosphate and consequently permits, in process cheese manufacture greater flexibility in handling holdover cheese.

10 Claims, No Drawings

METHOD FOR CONTROLLING MELTING PROPERTIES OF PROCESS CHEESE

FIELD OF THE INVENTION

The present invention relates generally to a method for controlling the melting properties of process cheese. More particularly, the method of the present invention is directed to the restriction of meltability of pasteurized process cheese products by incorporating denatured and or cross-linked whey protein in the finished product.

BACKGROUND OF THE INVENTION

The term "process cheese" generally refers to a class of cheese products which are produced by comminuting, mixing and heating lots of natural cheese into a homogenous plastic mass. The comminuted cheese is blended and sent to cookers or the like which commonly heat the mass to a temperature of 165°-185° F. During cooking, fat is stabilized with the protein and water by the addition of citrate or phosphate salts, usually at about a 3% level. The salts cause the protein to become more soluble. Under these circumstances a stable emulsion of protein, fat, and water occurs to provide a smooth, homogeneous mass. The hot mass is packaged directly, or formed into slices, and packaged. In the United States, Standards of Identity apply to process cheese and are established by the Food and Drug Administration (FDA). Certain of these classes can contain various additives, such as cream, milk, skim milk, buttermilk, cheese whey, and skim milk cheese. The moisture content of process cheese under the Standards of Identity may range from less than 40 percent to 60 percent, and the fat content may range from 20 percent to 35 percent. The pH range for process cheese products typically is between 5.0-6.5.

The traditional method for manufacture of process cheese, as described above, produces a process cheese which has a high melt value. The term "melt value", as used herein, is the ratio of the area of the melted cheese to the area of the unmelted cheese of a standard size cheese slice when subjected to certain standardized heating conditions, as described herein below. A melt value of 1.0 means that no melt has occurred at all, whereas a melt value of 2.0 would mean a doubling of the area of the cheese section during the melt test. Generally, the various types of process cheese will have a melt value of from about 2.3 to about 2.6.

The restriction of the meltability of process cheese is desirable in many applications. For example, it is desirable to restrict the meltability of cheese for a hamburger sandwich which is subjected to warming ovens for a period of time as occurs in many franchise hamburger operations. Melt restriction is also desirable for process cheese used inside a bakery item which is cooked. For example, cubes of process cheese which have been incorporated into cheese filled croissants.

Melt restriction is desirable for cheese and cheese related products which are prepared in the microwave oven. Melt restriction maintains the identity and/or form of the cheese and cheese related products which are subjected to microwave heating in various applications. Applications may include use in recipes or on sandwiches for example.

The traditional method for restricting meltability of process cheese products involves the use of sodium hexametaphosphate, sodium acid pyrophosphate and/or high rework levels of process cheese in the finished product. Typically controlling the finished product meltability with the traditional melt restricting methods results in considerable variation in texture and difficulty in controlling the texture.

SUMMARY OF THE INVENTION

In accordance with the present invention, the meltability of processed cheese is controlled to provide a desired degree of meltability by incorporating whey proteins in the process cheese mix and processing the process cheese mix under conditions of temperature and time so as to denature the whey proteins sufficiently to provide a predetermined level of cross-linked beta-lactoglobulin and provide the desired level of meltability. The whey protein provided in the process cheese blend is selected to limit the lactose in the final product to a predetermined level. The method of the present invention avoids the need for the use of sodium hexametaphosphate and consequently permits, in process cheese manufacture greater flexibility in handling holdover cheese.

DETAILED DESCRIPTION OF THE PRESENT INVENTION

Generally, in accordance with the present invention, whey proteins are incorporated into a process cheese blend. The remaining components of the process cheese blend are those traditionally used, such as selected lots of natural cheese, milkfat, cream, colors, salts and emulsifying agents and flavoring components.

The whey proteins may be provided from any suitable source, such as dried whey recovered from the manufacture of most natural cheeses, whey protein concentrates obtained by evaporation of moisture from whey and whey protein isolates obtained by separation of whey protein from the lactose and salts of whey by ultrafiltration or dialysis.

In a preferred embodiment of the present invention the whey protein is provided from a cheese manufacturing process involving membrane separation of milk, such as ultrafiltration. In this process, skim or whole milk is pumped at low pressure, through tubes or plates containing many small pores with a molecular weight cutoff of about 20,000 Daltons. The milk passes across the membranes, and much of the water, lactose, soluble salts and non-protein nitrogen of the milk pass through the pores as permeate. Retained are all the fat, protein (including whey protein), insoluble salt and some serum, which contains water, lactose, soluble salts and non-protein nitrogen. This retentate increases in concentration with time, so that its fat and protein may be five times greater than that of the starting milk. Emerging from the ultrafiltration unit is a plastic fluid, and this retentate has a similar composition to some cheeses. Cheesemaking is completed without vats, as there is no whey to separate. Simple mechanical injection of culture, rennet, salt, color, and fungal spores into the concentrated fluid may follow. A curd develops within 5-10 minutes and is placed directly in a ripening room. The above described process is set forth in an article, J. L. Maubois and G. Mocquot, "Applications of membrane ultrafiltration to preparation of various types of cheese", J. Dairy Sci., 58: 1001-1007.

The retentate from ultrafiltration of milk may alternatively be subjected to a known process to remove additional water, such as coagulation with rennet followed by separation of whey or by evaporation, such as is taught in U.S. patent application Ser. No. 089,914, filed on Aug. 24, 1987, to achieve cheese with moisture levels similar to cheddar cheese, Swiss cheese or the like.

The major advantage of the use of membrane separation for the production of cheese is that much greater cheese yields are obtained due to retention of whey protein in the cheese, a lower requirement for rennet, a higher potential for continuous process application and production of a neutral pH permeate with a reduced biochemical oxygen demand. Methods for the preparation of cheese from milk treated by membrane separation are described in U.S. patent application Ser. No. 649,848 filed on Sept. 11, 1984, U.S. Pat. Nos. 4,689,234 to Ernstrom et al., 4,268,528 to Montegny and 4,355,048 to Schoop et al.

The process cheese blend containing whey protein at desired levels, is then subjected to predetermined heating conditions so as to produce the desired melt value for the use intended for the cheese.

In general, the process cheese blend containing the whey protein is subjected to heat treatment conditions such that a minimum of about 0.5% of cross-linked beta-lactoglobulin, primarily coming from added whey protein, is provided in the process cheese mix. All percentages of components used herein are by weight of the final product, i.e. wet basis, unless otherwise indicated.

Beta-lactoglobulin may be denatured but not cross-linked. The extent of cross-linking of beta-lactoglobulin is easily measured using SDS polyacrylamide electrophoresis with and without disulfide-breaking reagents such as beta-mercaptoethanol or dithiothreitol. Without the disulfide-breaking reagent present, cross-linked beta-lactoglobulin does not migrate to the usual monomer position or may not enter the gel at all. Thus, the amount of cross-linked beta-lactoglobulin may be estimated by subtracting the amount of beta-lactoglobulin present without the disulfide-breaking reagent from the amount present with the disulfide-breaking reagent. The total beta-lactoglobulin can be measured by multiplying its percentage of total SDS gel intensity by the total protein content or may be estimated from the whey protein content according to the formulation.

As indicated above, the whey may be added to the cheese blend in various forms, some of which have high levels of lactose associated therewith. To prevent graininess from occurring in the finished process cheese, it is important to restrict the level of lactose in the final product. In general, it is preferred to limit the level of lactose in the final product to a level which will not impart undesirable flavor or texture to the final product. This level varies with the desired texture of the cheese product but is usually less than about 25% of the weight of moisture contained in the final product, preferably less than about 20%. The selection of a whey component for providing beta-lactoglobulin protein must be made so as to keep the lactose level in the final product below the above indicated level. In a most preferred embodiment of the present invention, the whey protein source should contain little or no lactose when providing the beta-lactoglobulin protein. Such whey components include cheese produced from ultrafiltered and diafiltered milk, and whey protein isolates.

Another requirement for the method of the present invention to restrict the meltability of process cheese is that the beta-lactoglobulin must be denatured in situ during cooking of the process cheese blend. While not wishing to be bound by any theory, it is believed that in situ denaturation of beta-lactoglobulin, which serves to cause the uncoiling of the globular protein, exposes sulfhydryl groups, which initiate a series of sulfhydryl-disulfide interchanges, resulting in intermolecular cross-linking of whey proteins and possibly para-kappa-casein. Cross-linking may also occur by non-covalent hydrophobic bonding of the denatured whey proteins. Such cross-linking acts to restrict the mobility of the protein of the process cheese product upon being subjected to subsequent heating and, hence, acts to restrict the meltability of the process cheese product.

It is apparent that other globular proteins, such as albumen from egg white and soy protein, could be used in the method of the invention as a partial or complete replacement for the beta-lactoglobulin of whey. Such other globular proteins are not currently authorized for use in any of the various process cheese types which have FDA Standards of Identity in the U.S., but may become authorized in the future or may be used in cheese analogs or in process cheese manufactured in some countries.

In order to effect in situ denaturation of beta-lactoglobulin, the whey proteins of the process cheese blend must not have been subjected to heat treatment conditions which would have resulted in any substantial denaturation of the whey proteins.

As indicated, it is necessary to provide a minimum of about 0.5% of in situ cross-linked beta-lactoglobulin in the process cheese product. To attain thee levels, the whey protein ingredient must be added to the process cheese mix at a level sufficient to provide a minimum of about 0.5% of undenatured beta-lactoglobulin in the process cheese mix. Higher levels of undenatured beta-lactoglobulin may be required if partial denaturation of the beta-lactoglobulin occurs during the heat treatment or cooking step.

In general, natural cheese, whether produced by traditional methods or from milk treated by ultrafiltration, is provided in the process cheese mix at a level sufficient to provide from about 0% to about 20% of oasein protein in the process cheese mix. Other ingredients, such as cream, milk, skim milk, buttermilk, emulsifying salts, condiments and flavorings can be added as required to obtain the type of process cheese desired. In general, the process cheese products of the invention will contain from about 20% to about 35% fat, from about 35% to about 60% moisture, from about 8% to about 25% total protein. The process cheese contains less than 25% lactose based on the level of moisture.

After the process cheese blend has been prepared containing undenatured beta-lactoglobulin in accordance with the invention, the process cheese blend is subjected to suitable heat treatment to effect substantial in situ denaturation and/or cross-linking of the beta-lactoglobulin to provide a minimum of about 0.5% cross-linked beta-lactoglobulin in the final product, preferably from about 1% to about 2.5% of cross-linked beta-lactoglobulin. Suitable heat treatment conditions have been found to be from a minimum of 180° F. for at least about 1 minute to about 200° F. for at least about 0.5 minutes. Intermediate temperatures require intermediate minimum times to effect denaturation of the beta-lactoglobulin. After heat treatment to effect denaturation of beta-lactoglobulin has taken place the process cheese is preferably cooled to a temperature suitable for holding the process cheese until packaging has taken place. Suitable holding temperatures are from about 130° F. to about 170° F. The process cheese may be formed into slices on a chill roll in accord with common practice.

In accordance with the present invention process cheeses are provided which have a melt value of from about 1 to about 2.3.

As used herein, the term "melt value" is the ratio of the area of the melted cheese to the area of the unmelted cheese, using a section of cheese one quarter inch high and 42 mm diameter which is placed in a covered petri dish for 5 minutes in an oven at a temperature which is suitable for the type of cheese, i.e. usually a temperature of from 350° F.to 450° F. Thus, a melt value of 1.0 means no melt of the cheese section occurs whereas a melt value of 2.0 indicates that a doubling of area occurs during the melt test. The same type of melt test can be carried out in a microwave oven using the same sample size placed in a petri dish and typically heating for 30 seconds on maximum power in a 700 watt oven. Some types of process cheese products are flowable at ambient temperatures and it is not possible to obtain melt values per se on such products. The method of the invention can, nevertheless, be used to stabilize the viscosity of such products at elevated temperatures and prevent excessive fluidity from causing these process cheese products from running at the elevated temperature. For such flowable products, the meltabilities are best compared using an apparatus for determination of dropping point or softening point, such as that which is part of the Mettler FP800 Thermosystem. In such an apparatus, the temperature at which a plug of cheese falls or sags through an orifice is measured.

The following examples further illustrate various features of the present invention but are not intended to in any way limit the scope of the invention, which is defined in the appended claims.

EXAMPLE 1

A series of process cheese samples was prepared in accordance with the composition set forth in Table 1. Percent whey protein levels were varied as indicated in the Table. All samples had a pH of 5.6. The ultrafiltered cheese was produced by the method described in U.S. patent Ser. No. 089,914 filed on Aug. 24, 1987. An amount of natural cheddar cheese was provided in each sample which was sufficient to maintain the total protein of a level of 18%. In all samples, optional dairy ingredients contributed 2.7% total protein and 2.1% of whey protein.

Each of the 5 samples set forth in Table 1 were subjected to various processing temperatures as indicated in Table 1. The process cheese blend for each sample was held at the indicated temperature for 60 seconds. As can be seen from Table 1, the melt value of the samples can be controlled by the level of whey protein provided in the process cheese mix and by control of the processing temperature.

EXAMPLE 2

A blend of American cheese and cheese produced from ultrafiltered and diafiltered milk containing a minimum of about 0.5% undenatured beta-lactoglobulin is combined with butterfat, water and mixed color. This mixture is thoroughly blended for uniformity. This mixture, which contains a moisture content of 39% and a fat content of 31.7% is combined with 2.5% sodium phosphate solids based on the weight of the pasteurized process cheese, and is heated in a closed, stainless steel steam jacketed kettle with agitation to a minimum temperature of 180° F. for at least about 1 minute. After heat treatment to effect denaturation of beta-lactoglobulin has taken place, the pasteurized process cheese is packaged and cooled to 100° F. within 2 hours. After the product has been further cooled to 45° F., a melt value of the sample is determined to be about 1.7.

EXAMPLE 3

A cheddar cheese sauce is prepared by blending cheddar cheese with sufficient quantities of cheese manufacture from ultrafiltered milk such that the cheese contributes 1.3% whey protein in the finished product. The cheese blend contributes 0.80% undenatured beta-lactoglobulin in the finished product. The cheese blend is combined with milk fat, water, natural flavorings, lactic acid and salt and mixed thoroughly. The combined ingredients are mixed with undenatured condensed whey and emulsifiers and cooked in a horizontal scraped surface heat exchanger for a period of 3 minutes at a minimum of 185° F. The product is cooled quickly and packaged in #10 tins. The finished product consists of 52.0% moisture, 16% fat, 14% protein. The pH of the finished product is 5.4. When the cheese sauce product is spread onto bread and placed in a pre-heated oven at 350° F. for 5 minutes, the cheese sauce will soften, however, the product will not run and will not be absorbed into the bread.

The method of the present invention provides a simple, easily controllable and inexpensive way to control the meltability of process cheese for use in a variety of applications.

TABLE 1

| Sample # | % Ultra-Filtered Cheese | % Whey Protein In Product | % Total Protein | Processing Temp | % Cross-linked beta-lactoglobin in final product | Melt Value |
| --- | --- | --- | --- | --- | --- | --- |
| 1 | 0 | 2.1 | 18.0 | 165 | 0.1 | 2.48 |
|   |   |   |   | 175 | 0   | 2.10 |
|   |   |   |   | 185 | 0.7 | 1.43 |
|   |   |   |   | 195 | 1.3 | 1.16 |
| 2 | 18.75 | 2.5 | 18.0 | 165 | 0.5 | 1.96 |
|   |   |   |   | 175 | 0.3 | 2.08 |
|   |   |   |   | 185 | 0.4 | 1.50 |
|   |   |   |   | 195 | 1.0 | 1.10 |
| 3 | 37.5 | 3.0 | 18.0 | 165 | 0.1 | 2.25 |
|   |   |   |   | 175 | 0.2 | 1.82 |
|   |   |   |   | 185 | 0.8 | 1.11 |
|   |   |   |   | 195 | 1.6 | 1.04 |
| 4 | 56.25 | 3.5 | 18.0 | 165 | 0   | 2.21 |
|   |   |   |   | 175 | 0.3 | 1.75 |
|   |   |   |   | 185 | 1.2 | 1.05 |
|   |   |   |   | 195 | 1.6 | 1.01 |
| 5 | 75 | 4.0 | 18.0 | 165 | 0.1 | 2.06 |
|   |   |   |   | 175 | 0.4 | 1.87 |
|   |   |   |   | 185 | 1.4 | 1.01 |

TABLE 1-continued

| Sample # | % Ultra-Filtered Cheese | % Whey Protein In Product | % Total Protein | Processing Temp | % Cross-linked beta-lactoglobin in final product | Melt Value |
| --- | --- | --- | --- | --- | --- | --- |
| | | | | 195 | 2.2 | 1.02 |

What is claimed is:

1. A method for restricting the meltability of process cheese products comprising preparing a process cheese blend having undenatured beta-lactoglobulin and heating said process cheese blend to a predetermined temperature for a predetermined time sufficient to substantially denature and cross-link said beta-lactoglobulin, said undenatured beta-lactoglobulin being present at a level sufficient to provide at least about 0.5% of cross-linked beta-lactoglobulin in said process cheese product when said process cheese product is subjected to said predetermined time and temperature conditions.

2. A method in accordance with claim 1 wherein said heating is to a temperature of at least about 180° F. for a time of at least about one minute.

3. A method in accordance with claim wherein the melt value of said process cheese blend after said heating is from about 1 to about 2.3.

4. A method-in accordance, with claim 1 wherein said udenatured beta-lactoglobulin is provided from a whey source selected from the group consisting of cheese produced from ultrafiltered milk, dried whey, whey protein isolates and whey concentrates.

5. A method.in accordance with claim 4 wherein the whey source is cheese produced from ultrafiltered milk.

6. A method in accordance with claim 1 wherein the lactose level in said process cheese blend is less than about 25% based on the weight of the moisture present.

7. A method in accordance with claim 1 wherein said undenatured beta-lactoglobulin is present in said process cheese blend in an amount sufficient to provide from about 0.5% to about 2.5% cross-linked beta-lactoglobulin in said process cheese mix after said heating.

8. A method in accordance with claim 1 wherein said process cheese blend has from about 35% to about 60% moisture.

9. A method in accordance with claim 1 wherein said process cheese blend has from about 9% to about 25% of total protein and from about 0% to about 20% of casein.

10. A method in accordance with claim 1 wherein said process cheese blend has from about 20% to about 35% of fat.

* * * * *

UNITED STATES PATENT AND TRADEMARK OFFICE
CERTIFICATE OF CORRECTION

PATENT NO. : 4,885,183

DATED : December 5, 1989

INVENTOR(S) : John J. Strandholm et al.

It is certified that error appears in the above-identified patent and that said Letters Patent is hereby corrected as shown below:

Column 4, Line 29, Change "thee" to --these--.

Column 4, Line 41, Change "oasein" to --casein--.

Column 5, Line 35, After "claims." insert a paragraph.

Column 6, In TABLE 1, Change the heading of
    column "Processing Temp" to --Processing Temp.--.

Column 7, Line 28, Change "method-in" to --method in--.

Column 7, Line 28, After "accordance" delete comma.

Column 7, Line 29, Change "udenatured" to --undenatured--.

Signed and Sealed this

Sixteenth Day of April, 1991

Attest:

HARRY F. MANBECK, JR.

*Attesting Officer*      *Commissioner of Patents and Trademarks*